(12) United States Patent
Marshall et al.

(10) Patent No.: US 10,860,853 B2
(45) Date of Patent: Dec. 8, 2020

(54) LEARNING THOUGH PROJECTION METHOD AND APPARATUS

(71) Applicant: Intel Corporation, Santa Clara, CA (US)

(72) Inventors: Carl S. Marshall, Portland, OR (US); Ravishankar Iyer, Portland, OR (US); Sejun Kim, Hillsboro, OR (US); Doye C. Emelue, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 15/582,106

(22) Filed: Apr. 28, 2017

(65) Prior Publication Data

US 2018/0314887 A1  Nov. 1, 2018

(51) Int. Cl.
*G02B 27/01* (2006.01)
*G06K 9/00* (2006.01)
*G06F 3/01* (2006.01)

(52) U.S. Cl.
CPC .......... *G06K 9/00671* (2013.01); *G06F 3/011* (2013.01); *G06K 9/00664* (2013.01); *G02B 2027/0138* (2013.01)

(58) Field of Classification Search
CPC .......... G06F 3/017; G06F 3/013; G06F 3/011; G06F 3/005; G06F 1/163; G06F 3/04842; G06F 19/3418; G06F 3/0488; G02B 2027/0178; G02B 27/017; G02B 27/0093; G02B 27/0172; G02B 2027/014; G02B 2027/0138; G02B 27/0179; G02B 2027/0185; G02B 2027/0187; G02B 27/0101; G06T 19/006; A61B 5/6803; A61B 2017/00017; A61B 2017/00115; A61B 2017/00199; A61B 2017/00212; G06K 9/00671; G06K 9/00664; G06K 9/6263; G06K 9/00369; G06K 9/78;
(Continued)

(56) References Cited

U.S. PATENT DOCUMENTS 8,447,863 B1 * 5/2013 Francis, Jr. ........... H04W 4/029
709/226
8,639,644 B1 * 1/2014 Hickman ............... G06N 3/008
700/245
(Continued)

FOREIGN PATENT DOCUMENTS

WO   2016176128 A1   11/2016

OTHER PUBLICATIONS

Alemzadeh et al., Safety Implications of Robotic Surgery: A Study of 13 Years of FDA Data on da Vinci Surgical Systems, Nov. 2013 [retrieved Feb. 26, 2020], Coordinated Science Laboratory, University of Illinois at Urbana-Champaign, 33 pages. Retrieved: https://www.ideals.illinois.edu/handle/2142/90441 (Year: 2013).*
(Continued)

*Primary Examiner* — Andrew M Moyer
*Assistant Examiner* — Dennis Rosario
(74) *Attorney, Agent, or Firm* — Schwabe, Williamson & Wyatt, P.C.

(57) ABSTRACT

Methods, apparatus, and system to enable and implement interaction between a computer device and a person (or people) such as via images and objects identified in such images. The interaction may make possible rapid and convenient machine learning with respect to such objects.

19 Claims, 8 Drawing Sheets

(58) Field of Classification Search
CPC ........... G06K 9/00389; G06K 9/00711; G06K 9/3241; G06K 9/00771; G06K 9/00335; G06K 2009/00738; G06K 9/00355; G06K 9/00718; G06K 9/00765; G06K 9/46; G06K 9/6227; G06K 9/00288; G06K 9/4652; G06K 9/6267; G06K 9/2081; G06K 9/66; G06N 20/00; G06N 3/008; G06N 3/08; Y10S 901/01; B25J 11/0005; B25J 9/163; G05B 19/423; G05B 2219/39451; G05B 2219/40116; A63F 13/213
See application file for complete search history.

(56) References Cited

U.S. PATENT DOCUMENTS

| | | | | |
|---|---|---|---|---|
| 8,996,429 | B1* | 3/2015 | Francis, Jr. | G06N 3/008 706/12 |
| 9,720,934 | B1* | 8/2017 | Dube | G06F 16/583 |
| 9,852,546 | B2* | 12/2017 | Kraver | G06T 19/006 |
| 9,987,752 | B2* | 6/2018 | Fisher | G08B 21/20 |
| 10,360,531 | B1* | 7/2019 | Stallman | G06K 7/1413 |
| 10,464,212 | B2* | 11/2019 | Gupta | B25J 13/006 |
| 2008/0100720 | A1* | 5/2008 | Brokish | G06T 5/002 348/222.1 |
| 2012/0061155 | A1* | 3/2012 | Berger | B25J 5/007 180/21 |
| 2013/0343640 | A1* | 12/2013 | Buehler | B25J 9/0087 382/155 |
| 2014/0275760 | A1 | 9/2014 | Lee et al. | |
| 2014/0371871 | A1* | 12/2014 | Farina | B25J 9/1612 623/24 |
| 2015/0338917 | A1* | 11/2015 | Steiner | H04L 9/3231 345/156 |
| 2016/0055677 | A1* | 2/2016 | Kuffner | G06T 19/006 345/633 |
| 2016/0158937 | A1 | 6/2016 | Kamoi et al. | |
| 2016/0224657 | A1* | 8/2016 | Mullins | G06F 16/951 |
| 2017/0238055 | A1* | 8/2017 | Chang | H04N 21/4532 725/19 |
| 2018/0288161 | A1* | 10/2018 | Saxena | H04L 67/22 |

OTHER PUBLICATIONS

Boyce, Augmented Reality as a Perceptual Aid in Robot Teleoperation, Feb. 28, 2007 [retrieved Feb. 26, 2020], thesis of North Carolina State University of Master of Science, 55 pages. Retrieved: https://repository.lib.ncsu.edu/handle/1840.16/2590 (Year: 2007).*

Green et al.,Human-Robot Collaboration: A Literature Review and Augmented Reality Approach in Design, Jan. 1, 2008 [retrieved Jul. 31, 2020], International Journal of Advanced Robotic Systems, vol. 5, No. 1, pp. 1-18. Retrieved: https://journals.sagepub.com/doi/full/10.5772/5664 (Year: 2008).*

Andersson, N., et al. "AR-Enhanced Human-Robot-Interaction—Methodologies, Algorithms, Tools," Procedia CIRP 44 (2016) 193-198, Retrieved from URL <<https://doi.org/10.1016/j.procir.2016.03.022>>.

* cited by examiner

LEARNING THOUGH PROJECTION METHOD AND APPARATUS

FIELD

The present disclosure relates to the fields of artificial intelligence and computer vision, in particular to, a computer device which learns in relation to images.

BACKGROUND

Robotics systems are being developed to allow computers to navigate in or translate through physical environments.

Computer systems are being developed to identify objects in images. Self-learning robotics refers to learning by a robotic computer system in the first-, second-, or third-person, relative to a (first-person) robotic system.

People can now wear augmented and virtual reality headsets or glasses which record images proximate to a wearer.

Figure 1:
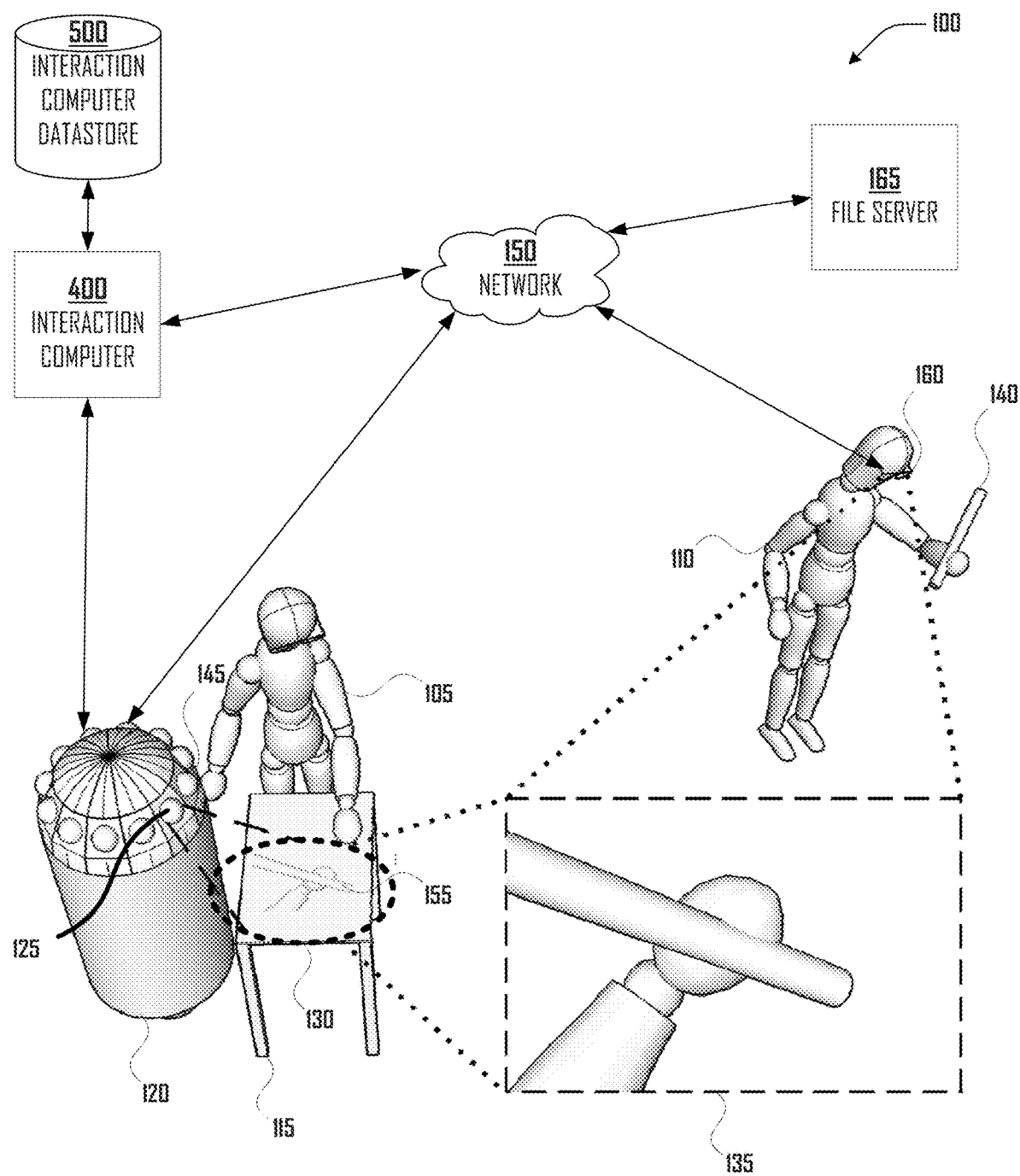
FIG. 1 is a network and device diagram illustrating an example of people interacting with computer devices in a network environment incorporated with teachings of the present disclosure, according to some embodiments.

Although the following Detailed Description will proceed with reference being made to illustrative embodiments, many alternatives, modifications, and variations thereof will be apparent to those skilled in the art.

DETAILED DESCRIPTION

Use of the singular herein should generally be understood to encompass the plural, unless the context clearly indicates otherwise. For example, "image" should be understood herein to refer to "image", "images", and to "video" (a sequence images); for example, "person" should be understood to refer to "people" unless the context makes clear that one person is being referred to or that different persons are involved in an interaction.

In overview, this disclosure relates to methods and systems to enable and implement interaction between a computer device and a person (or people). The interaction may include a communication interface of a computer device which obtains an image from a person. The image may be obtained from an augmented reality device of the person or may be obtained from an image file. A knowledge engine of the computer device may identify object(s) in the image.

Identification of objects by the knowledge engine may be according to a wide range of object identification techniques. For example, object identification techniques include supervised or unsupervised training models, geometric, 3-dimensional and/or kinematic object models, appearance-based methods (including methods which perform, for example, edge matching, "divide-and-conquer" searches, greyscale matching, gradient matching, which process histograms of receptive field responses, which process eigenvectors of templates), feature-based methods (including methods which use interpretation trees, which create and test hypothesis, which determine pose consistency, which perform pose clustering, which identify invariant geometric properties, which perform geometric hashing, which perform scale-invariant feature transformations, which perform speeded up robust features detection, or which determine "bag of words" representations for images), processes which utilize genetic algorithms, artificial neural networks, convolutional neural networks, and deep learning, deep structured learning, hierarchical learning, or deep machine learning techniques. The later may use a cascade of layers of nonlinear processing units for feature extraction and transformation, generally based on (supervised or unsupervised) learning of multiple levels of features, wherein higher level features are derived from lower level features to form a hierarchical representation.

Identification of objects by the knowledge engine may yield output such as, for example, pixel groups corresponding to the object, object tags or text, and an object definition. The object definition may be based on the object identification technique, and may include pixel groups and object tags. The knowledge engine may utilize a hardware accelerator in or of the computer device.

The communication interface may determine visually distinguished pixels corresponding to the identified object. Visually distinguished pixels may comprise, for example, pixels with a structure (such as a structured light field) or pixels with a change in at least one of hue, saturation, lightness, and greyscale relative to pixels in the image from the user.

The communication interface may direct the computer device to translate (or move) to a location, such as a location of the person, a location of gaze of the person, a location of an object within the gaze of the person. The knowledge engine may identify object(s) in environmental images. The communication interface may determine whether an object(s) in the environmental images correspond to the identified object from the user image.

The communication interface may determine where to output a processed image, such as onto a projection area or onto an object identified in the environmental images.

The communication interface may determine the processed image to output, comprising the visually distinguished pixels, and may output the processed image.

The communication interface may identify the output processed image in environmental images. The communication interface may determine, from environmental images, a property of the object based on the output processed image and its interaction with the object, as determined. The communication interface may update the object definition based on the determined property.

The communication interface may receive user input, such as voice, gesture, or text input. The communication interface may determine whether the user input corresponds to feedback relating to the identified object. Feedback may include, for example, a negation of the object (that the object is not an object), a confirmation of the object (that the object is an object), and/or an object property. The object property may comprise, for example, an edge of the object, a geometric shape of the object, an identification of the object as virtual or physical, or a metadata of the object. The metadata of the object may comprise, for example, a name, a type, a category, a place, a tag, or the like.

The feedback may be used to update the object definition.

When multiple objects are identified in image(s), the communication interface may iterate over some or all of such objects, to receive user feedback in relation thereto and to update more than one object definition.

In this way, the computer device and its communication interface and knowledge engine may learn about objects in an environment for example, to learn the correct names or other properties of objects. The communication interface may thus make possible convenient, fast, and interactive learning by the knowledge engine in a first-, second-, and/or third-person context, relative to the (first-person) of the robotic system.

FIG. 1 is a network and device diagram 100 illustrating an example of person 105 and person 110, one or both of whom may be interacting with computer devices in a network environment incorporated with teachings of the present disclosure, according to some embodiments. In the example illustrated in FIG. 1, person 105 may be interacting with robot 120. Robot 120 may have a humanoid or other form. Robot 120 may not be mobile. Robot 120 may comprise, be operatively coupled to, and/or may be in communication with interaction computer 400 (described further herein in relation to FIG. 4). Interaction computer 400 may comprise, be operatively coupled to, and/or may be in communication with interaction computer datastore 500 (described further herein in relation to FIG. 5).

In the example illustrated in FIG. 1, person 110 is wearing augmented reality glasses 160; as used herein, "augmented reality glasses" should be understood to be equivalent to a virtual reality headset or the like. Augmented reality glasses 160 may, for example, output images and receive input. The output images may overlay images onto the user's field of view and/or may replace the user's view with such images. The input may be from, for example, a camera, including a video camera, and/or the input may be via audio, tactile, text, and other input modalities from a human, such as person 110. Augmented reality glasses 160 may be supported by a separate computer, external to augmented reality glasses 160; such separate support computer may be present on person 110 or may be accessed via a network connection, such as via network 150.

In the example illustrated in FIG. 1, augmented reality glasses 160 of person 110 may obtain an image, such as image 135. In the example illustrated in FIG. 1, image 135 is the image of a lower arm and hand of person 110 and rod 140 held by person 110; image 135 is from the perspective of person 110, as recorded by a camera in or of augmented reality glasses 160. As illustrated in FIG. 1, image 135 may include pixels recorded in relation to rod 140, held by person 110. Pixels of image 135 may comprise, for example, RBG, greyscale, and/or depth information. A camera of augmented reality glasses 160 may record depth information, in addition to RGB and greyscale information.

In the example illustrated in FIG. 1, image 135 may be transmitted or otherwise communicated or relayed from augmented reality glasses 160 to interaction computer 400. Alternatively, image 135 may be provided to robot 120 via an image file, such as an image file selected by person 105 or by another process executed by interaction computer 400.

Interaction computer 400 may comprise, for example, communication module 600 and/or knowledge engine 700. Communication module 600 and/or knowledge engine 700 are examples of modules, processes, routines, and the like to interact with a person, such as person 105 and/or person 110; this interaction may include interaction with respect to, for example, image 135 and objects determined in relation thereto, such as by communication module 600 and knowledge engine 700. Please see the discussion, above, for an overview of such interaction or the discussion, below with references to FIGS. 6A-6B and 7, for a more detailed discussion of communication module 600 and/or knowledge engine 700.

In the course of the interaction, communication module 600 and knowledge engine 700 may identify an object in image 135, such as an object based on rod 140. Communication module 600 may output an image, such as image 130 (circled by heavy dotted lines). Image 130 may correspond to image 135; however, image 130 may comprise visually distinguished pixels 155 identifying the object identified by communication module 600 and knowledge engine 700. Visually distinguished pixels 155 may comprise, for example, text, such as a label, a structure light field, and/or pixels with a change in at least one of hue, saturation, lightness, and greyscale relative to pixels in image 135. Visually distinguished pixels 155 may be to communicate to a person, such as person 105, that an object was identified by communication module 600 and knowledge engine 700 in the location of or corresponding to visually distinguished pixels 155.

Image 130 may be output by, for example, an image output device of or in robot 120, such as projector 125 (robot 120 may comprise an array of output devices, such as projectors, haptic output devices, speakers, as well as an array of input devices). The image may be output onto a projection surface, such as onto the surface of table 115.

In the example illustrated in FIG. 1, person 105 provides input to robot 120. Such input may be in the form of text (which may be via a keyboard, not show, speech-to-text, or the like), gestures, speech input, or the like. Input may be received by, for example, one or more sensors of robot 120, such as cameras, microphones, tactile input interfaces, text input interfaces, or the like. Additional input, not from person 105, may also be received from, for example, sensors such as compass, gyroscope, inertial measurement units, global position system ("GPS") units and other location providing devices and services, thermometers, barometric pressure sensors, and the like. An example of a location of one such input interface is illustrated in FIG. 1 as camera 145. Camera 145 may be used to receive gesture input from person 105. Camera 145 may record depth in addition to RGB and greyscale information. Input devices of robot 120 may be referred to herein as environmental input devices.

The input of person 105 may be interpreted by robot 120, communication module 600, and/or knowledge engine 700 as feedback relating to the object identified by communication module 600 and knowledge engine 700 and identified with visually distinguished pixels 155. The interpreted feedback may be, for example, that the object (identified with visually distinguished pixels 155) is not an object (it may have been identified in error), that it is an object, and/or the interpreted feedback may provide a property of the object. For example, person 105 may trace an edge in image 130 and may thereby communicate that an edge of the corresponding object should follow the trace made by person 105, rather than (or in addition to) visually distinguished pixels 155. For example, person 105 may provide speech or text input to provide a name of the object. Many other forms of feedback are possible, such as feedback to confirm or negate an identified object, provides metadata of or to be associated with the identified object, or the like.

In this way, person 105 may provide feedback relating to object(s) identified by communication module 600 and knowledge engine 700 from image 135 received or obtained from person 110 and/or augmented reality device 160 of person 110.

Also illustrated in FIG. 1 is network 150. Network 150 may comprise computers, switches, routers, gateways, network connections among the computers, and software routines to enable communication between the computers over the network connections. Examples of Network 150 comprise wired networks, such as an Ethernet networks, and/or a wireless networks, such as a WiFi, GSM, TDMA, CDMA, EDGE, HSPA, LTE or other network provided by a wireless service provider; local and/or wide area; private and/or public, such as the Internet. More than one network may be involved in a communication session between the illustrated devices. Connection to Network 150 may require that the computers execute software routines which enable, for example, the seven layers of the OSI model of computer networking or equivalent in a wireless phone network.

Also illustrated in FIG. 1 is file server 165. File server 165 may be a source of image files (similar to image 135), when images are provided to interaction computer 400 other than from augmented reality glasses 160 (such as an image file selected by a person or by another process in interaction computer 400).

Figure 2:
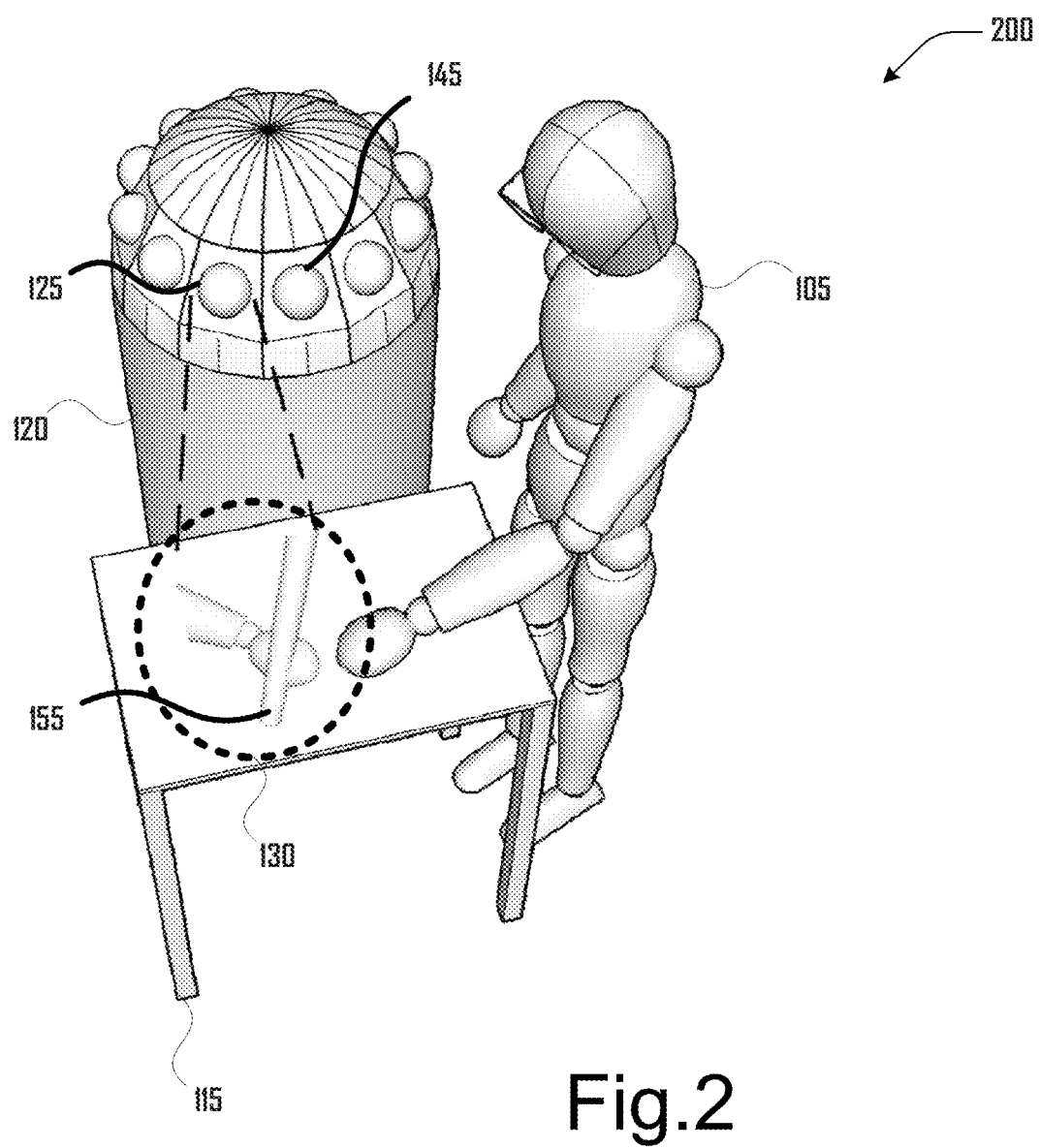
FIG. 2 is a detail view of a portion of FIG. 1, further illustrating interaction between a person and a computer device.

FIG. 2 is a detail view 200 of a portion of FIG. 1, illustrating interaction between a person and a computer device discussed in relation to FIG. 1. FIG. 2 is provided in the event that any elements discussed in FIG. 1 are unclear, such as if image 130 is not clearly distinguishable or if interaction by person 105 with image 130 is unclear.

Figure 3:
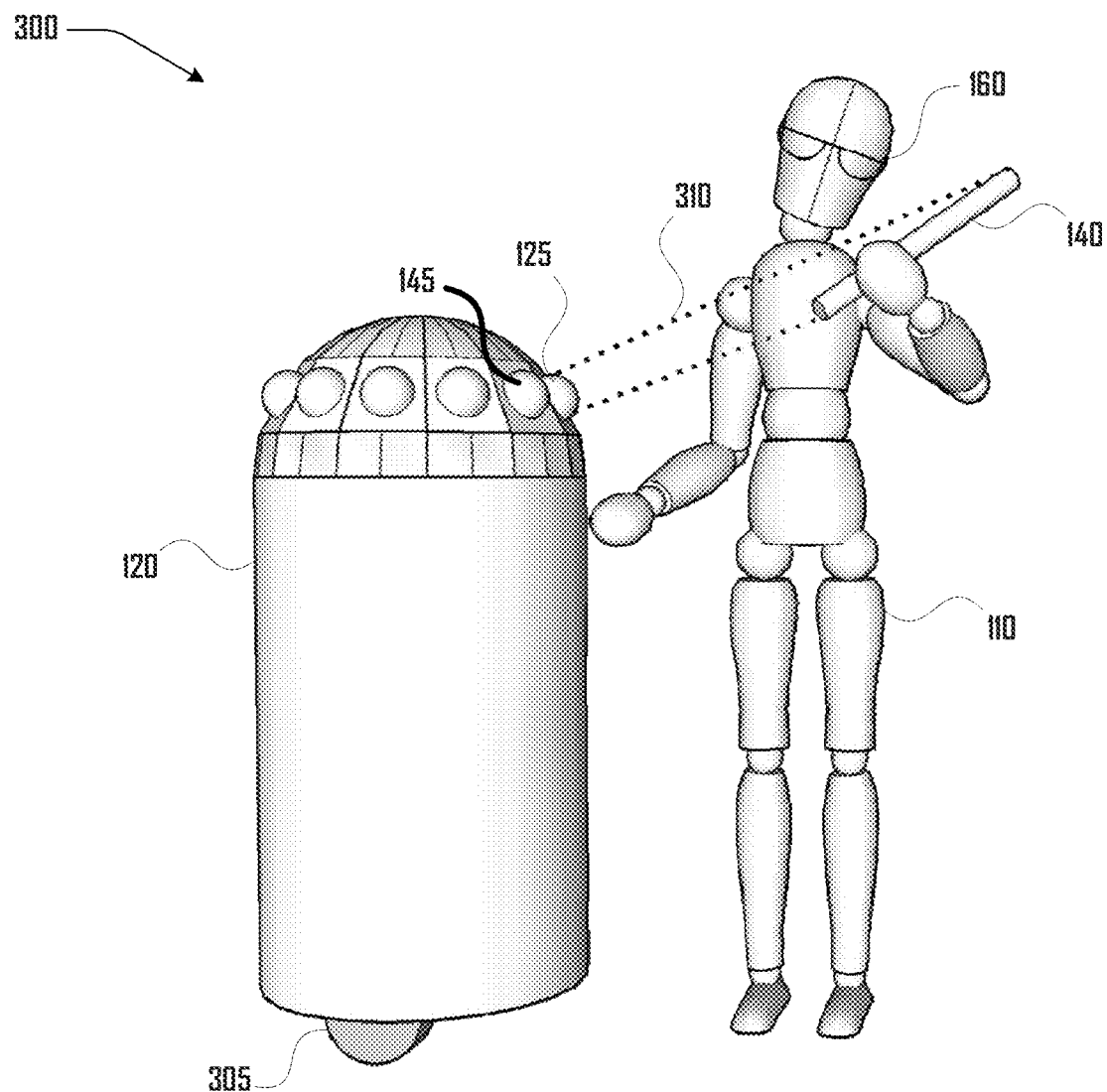
FIG. 3 is a network and device diagram illustrating an example of a person interacting with computer devices, according to some embodiments.

FIG. 3 is a network and device diagram illustrating an example of person 110 interacting with computer devices, according to some embodiments. For the sake of convenience, person 110, robot 120, augmented reality glasses 160, rod 140, camera 145 and projector 125 are re-used from FIG. 1 (and person 110 and rod 140 have the same pose), though it should be understood that these element may or may not be the same.

In FIG. 3, robot 120 has received an image, such as an image from augmented reality glasses 160. Such image may be similar to, for example, image 135 of FIG. 1. Similar to the discussion in relation to FIG. 1, robot 120 and communication module 600 and knowledge engine 700 may have identified an object in the image, such as an object corresponding to rod 140.

Robot 120 may have also received a location of person 110 and/or of rod 140 and/or of an area within the gaze of person 110. Communication module 600 may cause robot 120 to translate (move) toward such location. Such translation may utilize, for example, a robotic actuator, such as, for example, translation mechanism 305 as well as modules to determine a route and prevent collisions, and the like, to translate toward such location. Robot 120 may have the shape of a humanoid; translation mechanism 305 may comprise wheels, treads, legs, limbs, or the like. As discussed further in relation to FIG. 6 and communication module 600, such translation may be guided by the provided location, by GPS, location service, and/or by recognition of objects by communication module 600 and knowledge engine 700 in environmental input. For example, communication module 600 may cause robot 120 to translate to the location and/or until an object is recognized in environmental input of robot 120, which object is equivalent to an object identified by communication module 600 in an image (e.g. until identification of an object in environmental input corresponding to rod 140).

Upon arriving or being at the location, communication module 600 may output visually distinguished pixels corresponding to the object identified by communication module 600 and knowledge engine 700. The visually distinguished pixels are illustrated in FIG. 3 as a projection 310 from projector 125. Projection 310 may be onto a display surface, as in FIG. 1, and/or may be onto the object identified by communication module 600 as being equivalent to the object identified by communication module 600 in the image from the user (an object in environmental input corresponding to rod 140). As noted, the visually distinguished pixels may comprise structured light, such as a grid or known spatial arrangement. The visually distinguished pixels may be of a hue or frequency the same as or different from the image from the user. The visually distinguished pixels may be intended to be identifiable, such as by communication module 600, knowledge engine 700, and/or by a person. Though generally described as "visually" distinguished pixels, the visually distinguished pixels may be intended to not be visible to a person, such as if they are infrared electromagnetic radiation. The visually distinguished pixels may comprise or communicate a code or identifier.

Robot 120 may receive environmental input, such as via camera 145. Communication module 600 may utilize such input to determine properties of the object, such as whether the object was correctly identified, its color, shape, and the like.

As discussed in relation to FIG. 1, communication module 600 may also or alternatively receive user input. Such user input may be interpreted as feedback in relation to the identified object, such as confirmation or negation of the object and/or a property of the object.

In this way, person 110 may provide feedback relating to object(s) identified by communication module 600 and knowledge engine 700 from an image received or obtained from person 110 and/or augmented reality device 160 of person 110.

Figure 4:
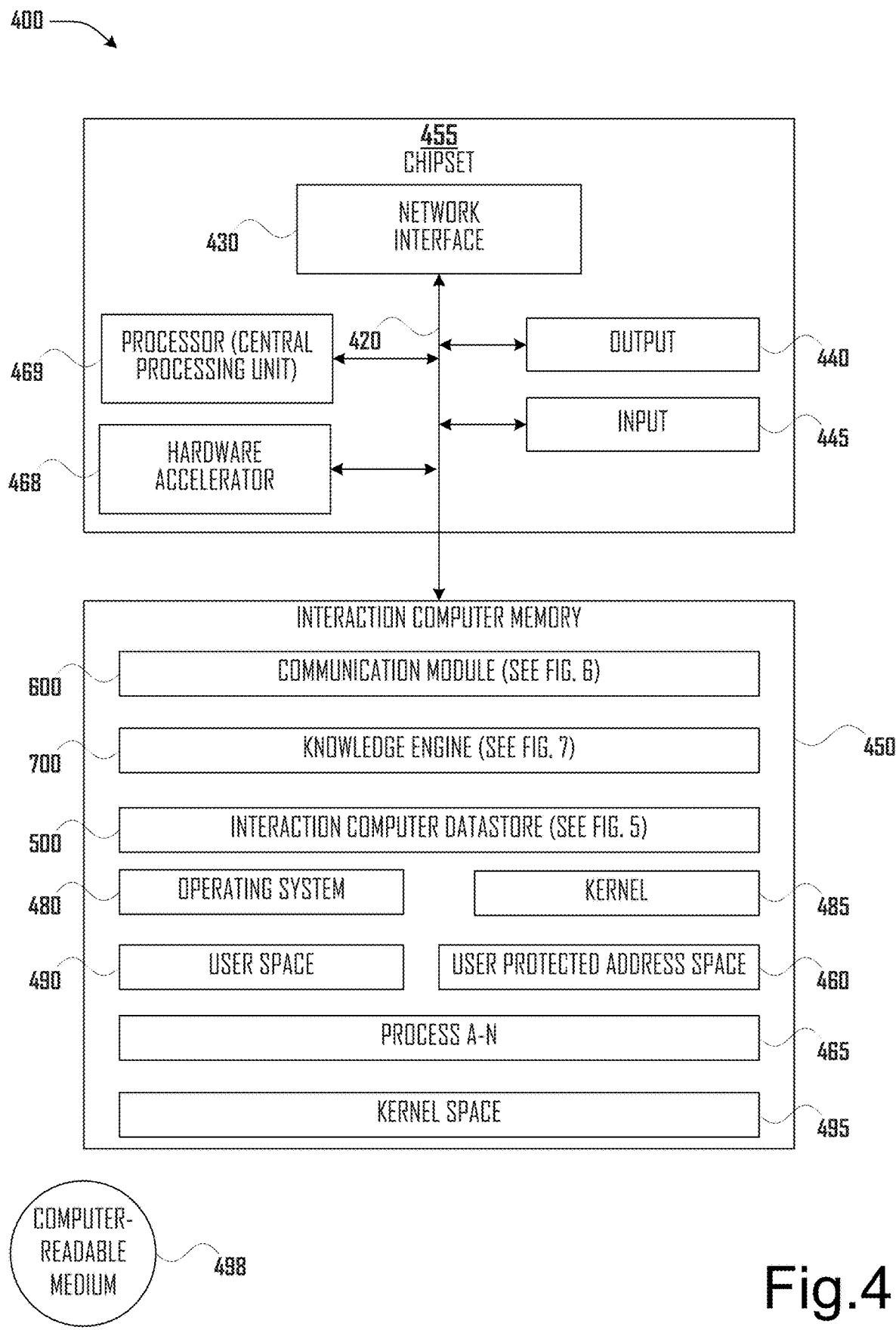
FIG. 4 is a functional block diagram illustrating an example of an interaction computer device incorporated with teachings of the present disclosure, according to some embodiments.

FIG. 4 is a functional block diagram illustrating an example of an interaction computer 400 incorporated with teachings of the present disclosure, according to some embodiments.

Interaction computer 400 may include chipset 455, comprising processor 469, hardware accelerator 468, input/output (I/O) port(s) and peripheral device interfaces, such as output interface 440 and input interface 445, and network interface 430, and interaction computer memory 450, all interconnected via bus 420. Network Interface 430 may be utilized to couple processor 469 to a network interface card (NIC) to form connections with network 150, with interaction computer datastore 500, or to form device-to-device connections with other computers.

Chipset 455 may include communication components and/or paths, e.g., buses 420, that couple processor 469 and hardware accelerator 468 to peripheral devices, such as, for example, output interface 440 and input interface 445, which may be connected via I/O ports. For example, chipset 455 may include a peripheral controller hub (PCH) (not shown). In another example, chipset 455 may include a sensors hub. Input interface 445 and output interface 440 may couple processor 469 to input and/or output devices that include, for example, user and machine interface device(s) including a display, a projector, a touch-screen display, printer, keypad, keyboard, etc., sensor(s) including inertial measurement units, cameras, global positioning system (GPS), etc., storage device(s) including hard disk drives, solid-state drives, removable storage media, etc. I/O ports for input interface 445 and output interface 440 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Cameras with which chipset 455 and interaction computer 400 may connect or be coupled may include, for example, cameras capable of recording depth information in addition to RGB and greyscale information. For example, such a camera may be an INTEL REALSENSE® 3D Camera.

Processor 469 may include one or more execution core(s), which may be central processing units ("CPUs") and/or graphics processing units ("GPUs") one or more registers, and one or more cache memor(ies). Processor 469 may include a memory management unit (MMU) to manage memory accesses between processor 469 and interaction computer memory 450. In some embodiments, processor 469 may be configured as one or more socket(s); each socket may include one or more core(s), a plurality of registers and one or more cache memor(ies). Each core may be configured to execute one or more process(es) 465 and/or one or more thread(s). A plurality of registers may include a plurality of general purpose registers, a status register and an instruction pointer. Cache(s) may include one or more cache memories, which may be used to cache communication module 600 and knowledge engine 700 of the present disclosure.

Processor 469 may be complemented by or comprise hardware accelerator 468. Hardware accelerator 468 may, for example, be an Application Specific Integrated Circuit ("ASIC"), a System on a Chip ("SoC"), an electronic circuit, a programmable circuit such as a Field Programmable Gate Array ("FPGA"), a graphics processor (shared, dedicated, or group), and/or memory (shared, dedicated, or group) such as a set of registers dedicated to concurrent or parallel comparison of vectors. Hardware accelerator 468 may be used accelerate performance of computationally intensive operations, such as object identification and image processing.

Interaction computer memory 450 may generally comprise a random access memory ("RAM"), a read only memory ("ROM"), and a permanent mass storage device, such as a disk drive or SDRAM (synchronous dynamic random-access memory). Interaction computer memory 450 may store program code for software modules or routines, such as, for example, communication module 600 (illustrated and discussed further in relation to FIG. 6) and knowledge engine 700 (illustrated and discussed further in relation to FIG. 7).

Interaction computer memory 450 may also store operating system 480. These software components may be loaded from a non-transient computer readable storage medium 498 into interaction computer memory 450 using a drive mechanism associated with a non-transient computer readable storage medium 498, such as a floppy disc, tape, DVD/CD-ROM drive, memory card, or other like storage medium. In some embodiments, software components may also or instead be loaded via a mechanism other than a drive mechanism and computer readable storage medium 498 (e.g., via network interface 430).

Interaction computer memory 450 is also illustrated as comprising kernel 485, kernel space 495, user space 490, user protected address space 260, and interaction computer datastore 500 (illustrated and discussed further in relation to FIG. 3).

Interaction computer memory 450 may store one or more process 465 (i.e., executing software application(s)). Process 465 may be stored in user space 490. Process 465 may include one or more other processes 465a . . . 465n. One or more process 465 may execute generally in parallel, i.e., as a plurality of processes and/or a plurality of threads.

Interaction computer memory 450 is further illustrated as storing operating system 480 and/or kernel 485. The operating system 480 and/or kernel 485 may be stored in kernel space 495. In some embodiments, operating system 480 may include kernel 485. Operating system 480 and/or kernel 485 may attempt to protect kernel space 495 and prevent access by one or more process 465a . . . 465n.

Kernel 485 may be configured to provide an interface between user processes and circuitry associated with interaction computer 400. In other words, kernel 485 may be configured to manage access to processor 469, chipset 455, I/O ports and peripheral devices by process 465. Kernel 485 may include one or more drivers configured to manage and/or communicate with elements of interaction computer 400 (i.e., processor 469, chipset 455, I/O ports and peripheral devices).

Figure 5:
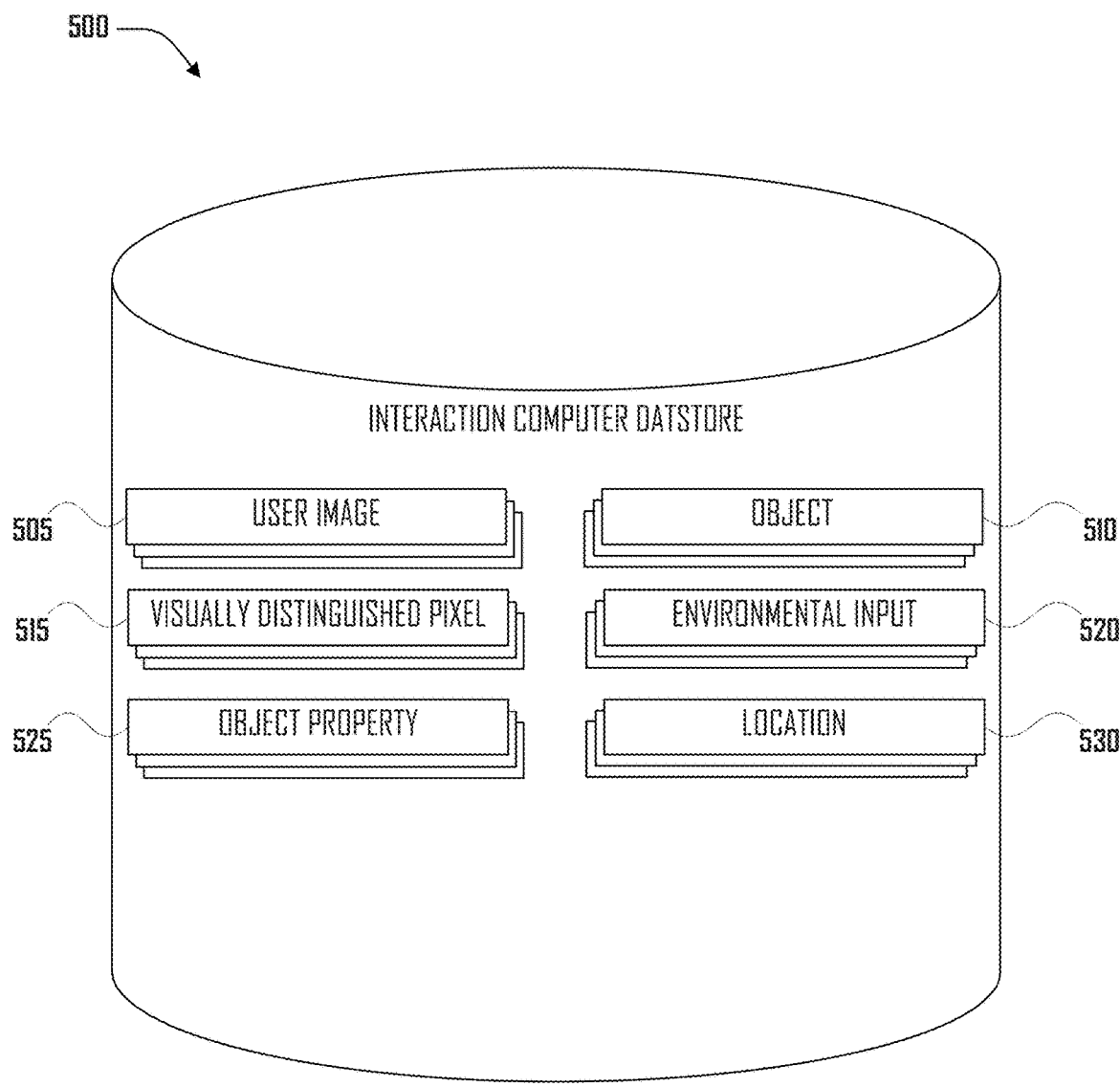
FIG. 5 is a functional block diagram illustrating an example of a interaction computer device datastore which may be used for practicing the present disclosure, consistent with embodiments of the present disclosure.

Interaction computer 400 may also comprise or communicate via bus 420 and/or network interface 430 with interaction computer datastore 500, illustrated and discussed further in relation to FIG. 5. In various embodiments, bus 420 may comprise a high speed serial bus, and network interface 430 may be coupled to a storage area network ("SAN"), a high speed wired or wireless network, and/or via other suitable communication technology. Interaction computer 400 may, in some embodiments, include many more components than as illustrated. However, it is not necessary that all components be shown in order to disclose an illustrative embodiment.

FIG. 5 is a functional block diagram of the interaction computer datastore 500 illustrated in the computer device of FIG. 4, according to some embodiments. Interaction computer datastore 500 may comprise multiple datastores, in and/or remote with respect to interaction computer 400. Datastore 500 may be distributed. The components of interaction computer datastore 500 may include data groups used by modules and/or routines, e.g., user image 505, object 510, visually distinguished pixels 515, environmental input 520, object property 525, and location 530 (to be described more fully below). The data groups used by modules or routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of interaction computer datastore 500 are discussed further herein in the discussion of other of the Figures. In overview, user image 505 may be a record of or associated with an image from or associated with a person; object 510 may be a record of or associated with an object identified by or known to knowledge engine 700; visually distinguished pixels 515 may be a record of visually distinguished pixels prepared in relation to an object, such as an object 510 record, and an image, such as a user image 505 record; environmental input 520 may be a record recording an environmental input to interaction computer 400, such as an image, a sound, a text input, a tactile input, or the like; object property 525 may be a record of metadata associated with an object, such as with an object 510 record; and location 530 may be a record of a location, such as a latitude and longitude, and address, or the like.

Figure 6A:
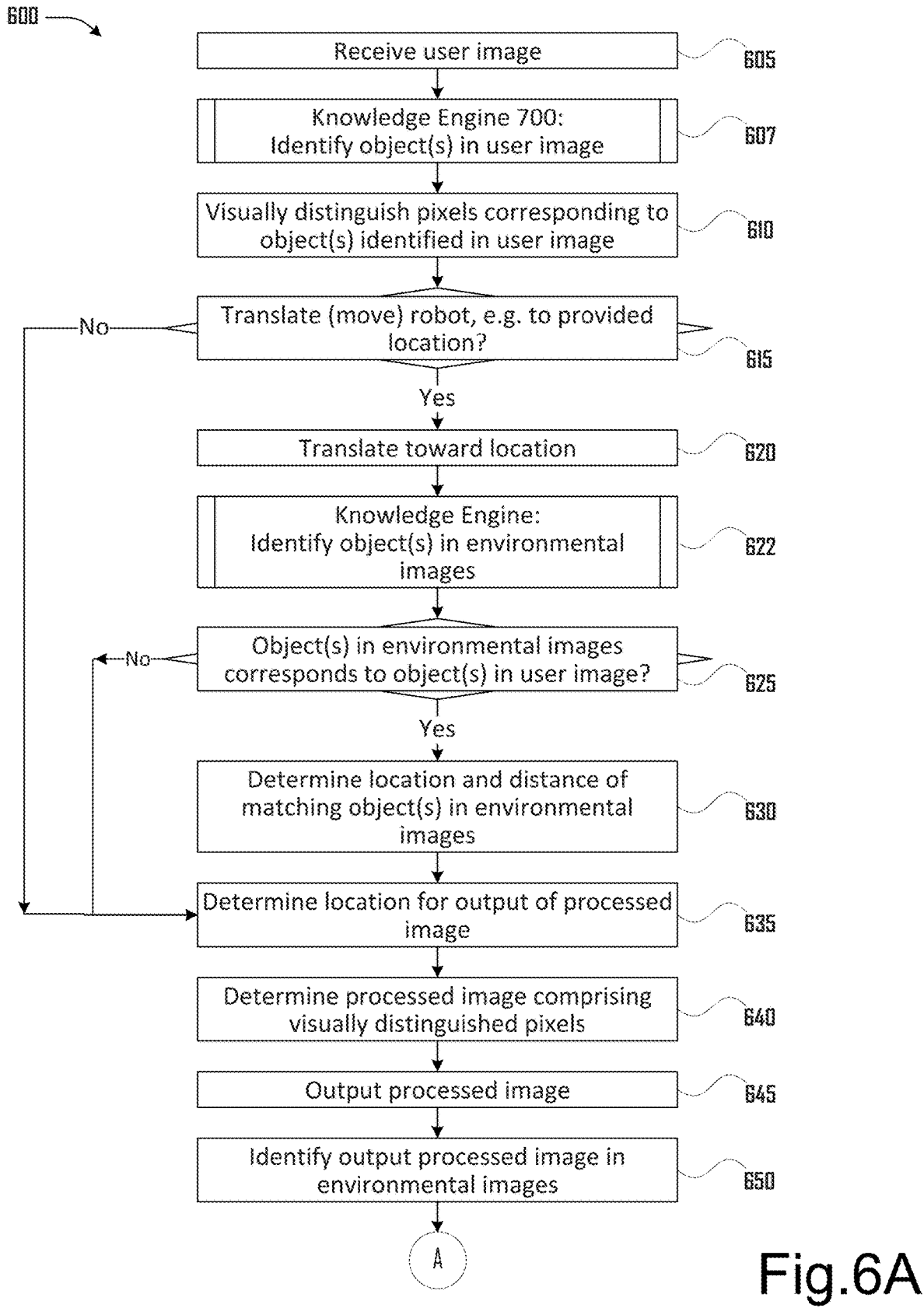
FIG. 6A is first portion of a flow diagram illustrating an example of a method performed by a communication module of the interaction computer, according to some embodiments.
Figure 6B:
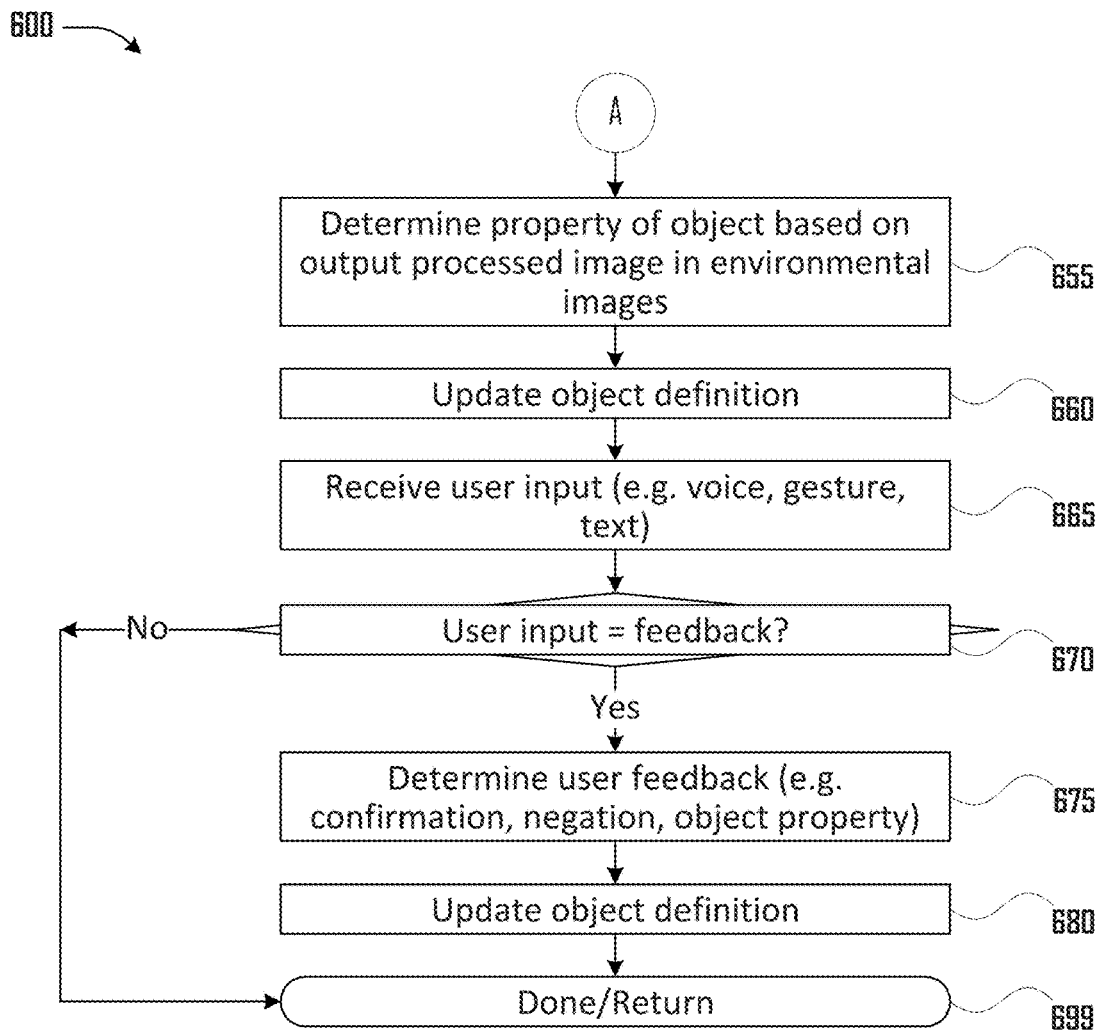
FIG. 6B is a second portion of the flow diagram illustrating the example of the method performed by the communication module, according to some embodiments.

FIG. 6A is first portion of a flow diagram illustrating an example of a method performed by communication module 600, according to some embodiments. FIG. 6B is a second portion of the flow diagram illustrating the example of the method performed by communication module 600, according to some embodiments. Communication module 600 may be performed by, for example, interaction computer 400; performance of communication module 600 (or portions thereof) may be accelerated by, for example, hardware accelerator 468.

At block 605, communication module 600 may receive an image from or associated with a person. As noted the image may comprise a video. The video may be received from an augmented reality device, virtual reality headset, or from a file server. The image may be store as, for example, one or more user image 505 records.

At block 607, communication module 600 may identify object(s) in the image of block 605. Identification of objects may be performed by, for example, knowledge engine 700. Identified objects may comprise, for example, object pixel groups, such as groups of pixels determined to be part of one object, object tags, such as text describing or associated with the object, and an object definition. The object definition may comprise text, such as text from object tags. Such objects may be stored as, for example, one or more object 510 records.

At block 610, communication module 600 may form or determine visually distinguished pixels corresponding to object 510 records. As noted, the visually distinguished pixels may comprise, for example, pixels with a structure (such as a structured light field) or pixels with a change in at least one of hue, saturation, lightness, and greyscale relative to pixels in the image from the user and the corresponding object 510 record. The visually distinguished pixels may be stored as, for example, one or more visually distinguished pixel 515 records.

At decision block 615, communication module 600 may determine whether interaction computer 400 or a robot thereof is to be translated to a location, such as a location provided by a user, associated with a user image, such as user image 505, or associated with an object 510 record. Such a location may be stored in, for example, one or more location 530 records. If affirmative or equivalent at decision block 615, at block 620, communication module 600 may cause interaction computer 400 or a robot thereof to translate toward the location. As noted, translation toward the location may involve utilization of a robotic actuator as well as modules to determine a route and prevent collisions.

At block 622, communication module 600 may identify objects in environmental input received by interaction computer 400, such as in images. Such images may be stored as, for example, one or more environmental input 520 records. Identification of objects may be performed by, for example, knowledge engine 700. Identified objects may comprise, for example, object pixel groups, such as groups of pixels determined to be part of one object, object tags, such as text describing or associated with the object, and an object definition. The object definition may comprise text, such as text from object tags. Such objects may be stored as, for example, one or more object 510 records.

At decision block 625, communication module 600 may determine whether one of more of the object 510 records of block 622 correspond to the object 510 records of block 607.

If affirmative or equivalent at decision block 625, at block 630 communication module 600 may determine a location and distance of such matching object(s) in environmental input.

At block 635, which may follow decision block 615 or decision block 625 if negative or equivalent, communication module 600 may determine a location on which to output a processed image. Such location may be, for example, a display area, such as a flat area, and/or a location of a matching object, such as the location determined in block 630. The processed image may comprise, for example, pixels of one or more visually distinguished pixel 515 records. The processed image may comprise a combination of a user image 505 and such pixels of one or more visually distinguished pixel 515 records.

At block 645, communication module 600 may output onto the location determined at block 635, the processed image and pixels of one or more visually distinguished pixel 515 records of block 640.

At block 650, communication module 600 may identify the output processed image of block 645, in environmental input.

Symbol "A" in FIG. 6A indicates to move to symbol "A" in FIG. 6B.

At block 655, communication module 600 may determine a property of the object of block 607 based on the output of the processed image of 645 and its identification in block 650. For example, if the output image comprises structured light, communication module 600 may be able to measure the object. For example, if the output image comprises light of a selected frequency, communication module 600 may be able to measure frequency absorption by the object.

At block 660, communication module 600 may update a definition of the object, as may be recorded in the corresponding object 510 record, with a result of block 655.

At block 665, communication module 600 may receive user input, e.g. voice, gesture, text, haptic, or other input. Such input may be prompted by a prompt output by communication module 600.

At decision block 670, communication module 600 may determine whether the user input of block 665 is feedback in relation to the object of block 607. Such determination may be made by visual recognition of objects of a user, such as using knowledge engine, and interaction of such user objects with the object of block 607, as determined in environmental input (gesture input). Such determination may be made by speech-to-text conversion.

At block 675, communication module 600 may determine the type of user feedback, such as whether the user feedback is a confirmation or negation of the object or whether the user feedback provides or modifies an object definition, such as a name, an edge, a geometric shape, or the like.

At block 680, communication module 600 may update a definition of the object, as may be recorded in the corresponding object 510 record, with a result of block 675.

At done block 699, communication module 600 may conclude and/or return to a process which may have called it.

Figure 7:
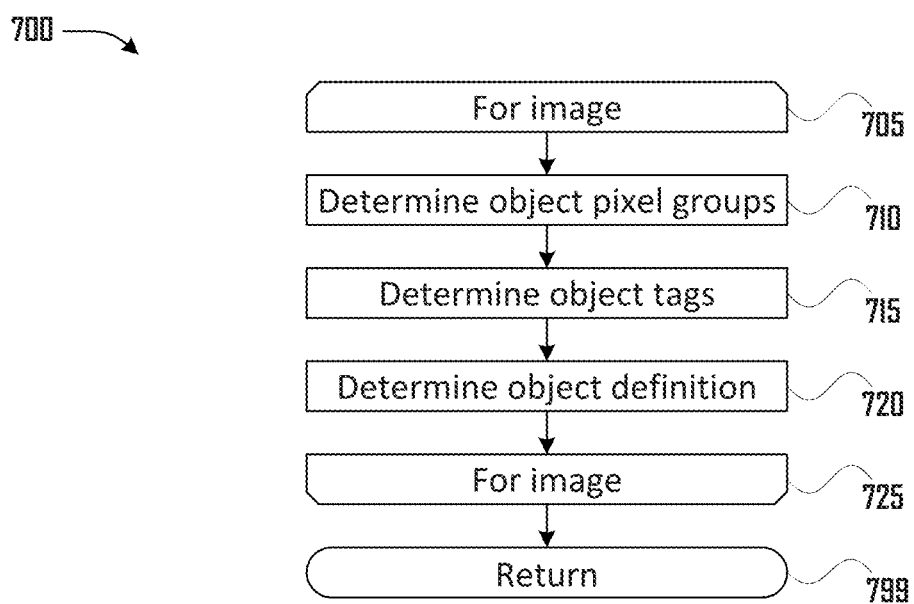
FIG. 7 is a flow diagram illustrating an example of a method performed by a knowledge engine, according to some embodiments.

FIG. 7 is a flow diagram illustrating an example of a method performed by knowledge engine 700, according to some embodiments. Knowledge engine 700 may be performed by, for example, interaction computer 400 and/or an external computer (which may be provided images according to an application program interface for knowledge engine 700). Performance of knowledge engine 700 may be aided by, for example, hardware accelerator 468. Knowledge engine 700 may perform object recognition or identification of objects, such as according to object identification techniques discussed herein.

Opening loop block 705 to closing loop block 725 may iterate over an image, such as a user image 505 record, an image in an environmental input 520 record, or the like.

At block 710, knowledge engine 700 may determine or output object pixel groups in the then-current image.

At block 715, knowledge engine 700 may determine object tags in relation to the then-current image.

At block 720, knowledge engine 700 may determine an object definition in relation to the then-current image.

At done block 725, knowledge engine 700 may return to a process which may have called it, such as communication module 600.

Following are defined terms in this document.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used herein, "circuitry", may comprise, for example, singly or in any combination, hardwired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

EXAMPLE 1

An apparatus comprising: a mechanism to operate in a physical environment, a communication interface to receive an image from a user, a knowledge engine coupled to the communication interface to identify an object in the image, the communication interface to output, via an image output device, a processed image identifying the object, to receive an environmental input from an environmental input device, and to determine a user feedback based on the environmental input in relation to the processed image.

EXAMPLE 2

The apparatus according to Example 1, wherein to determine the user feedback in relation to the processed image comprises to determine whether the user feedback provides at least one of a confirmation of the object, a negation of the object, or a property of the object.

EXAMPLE 3

The apparatus according to Example 2, wherein the property of the object comprises at least one of an edge of the object, a geometric shape, an identification of the object as virtual or physical, or a metadata of the object.

EXAMPLE 4

The apparatus according to one or more of Example 1 to Example 3, wherein to output the processed image identifying the object comprises to form visually distinguished pixels corresponding to the object and output the visually distinguished pixels corresponding to the object.

EXAMPLE 5

The apparatus according to Example 4, wherein to form visually distinguished pixels corresponding to the object comprises to form pixels comprising at least one of a label, a structure light field, or pixels with a change in at least one of hue, saturation, lightness, and greyscale relative to pixels in the image from the user.

EXAMPLE 6

The apparatus according to one or more of Example 1 to Example 3, wherein the knowledge engine is further to receive the image from an augmented reality headset associated with the user or an image file identified by the user.

EXAMPLE 7

The apparatus according to one or more of Example 1 to Example 3, wherein the environmental input device comprises at least one of a camera, a microphone, and a location service device, wherein the environmental input comprises at least one of an image, a speech or auditory input, a gesture input, or a text input.

EXAMPLE 8

The apparatus according to one or more of Example 1 to Example 3, wherein the mechanism to operate in the physical environment further comprises a robotic actuator to translate the apparatus through a space.

EXAMPLE 9

The apparatus according to Example 8, wherein the knowledge engine is further to receive a location and is to translate the apparatus through the space via the robotic actuator to at least one of the location or until the knowledge engine identifies a physical object in the environmental input from the environmental input device corresponding to the object identified in the image.

EXAMPLE 10

The apparatus according to Example 9, wherein to output the processed image identifying the object comprises to form visually distinguished pixels corresponding to the object and wherein the image output device is to output visually distinguished pixels corresponding to the object onto the physical object.

EXAMPLE 11

The apparatus according to Example 10, wherein the image is a first image and wherein the knowledge engine is further to receive a second image from the environmental input device and is to identify in the second image the processed image output by the image output device.

EXAMPLE 12

The apparatus according to Example 11, wherein the knowledge engine is to determine a property of the physical object based on the processed image output by image output device and identified in the second image.

EXAMPLE 13

A computer device implemented method, comprising: with a mechanism to operate in a physical environment, receiving an image from a user, identifying an object in the image, outputting, via an image output device, a processed image to identify the object, receiving an environmental input from an environmental input device, and determining a user feedback based on the environmental input in relation to the processed image.

EXAMPLE 14

The method according to Example 13, determining the user feedback in relation to the processed image comprises determining whether the user feedback provides at least one of a confirmation of the object, a negation of the object, or a property of the object.

EXAMPLE 15

The method according to Example 14, wherein the property of the object comprises at least one of an edge of the object, a geometric shape, an identification of the object as virtual or physical, or a metadata of the object.

EXAMPLE 16

The method according to Example 13 to Example 15, wherein outputting the processed image to identify the object comprises forming visually distinguished pixels corresponding to the object and outputting the visually distinguished pixels corresponding to the object.

EXAMPLE 17

The method according to Example 16, wherein forming visually distinguished pixels corresponding to the object comprises forming pixels comprising at least one of a label, a structure light field, or pixels with a change in at least one of hue, saturation, lightness, and greyscale relative to pixels in the image from the user.

EXAMPLE 18

The method according to Example 13 to Example 15, further comprising receiving the image from an augmented reality headset associated with the user or an image file identified by the user.

EXAMPLE 19

The method according to Example 13 to Example 15, wherein the environmental input device comprises at least one of a camera, a microphone, and a location service device, wherein the environmental input comprises at least one of an image, a speech or auditory input, a gesture input, or a text input.

EXAMPLE 20

The method according to Example 13 to Example 15, wherein the mechanism to operate in the physical environment further comprises a robotic actuator to translate through a space.

EXAMPLE 21

The method according to Example 20, further comprising receiving a location and using the robotic actuator to translate through the space to at least one of the location or until identifying a physical object in the environmental input from the environmental input device corresponding to the object identified in the image.

EXAMPLE 22

The method according to Example 21, wherein outputting the processed image identifying the object comprises forming visually distinguished pixels corresponding to the object and outputting the visually distinguished pixels corresponding to the object onto the physical object using the image output device.

EXAMPLE 23

The method according to Example 22, wherein the image is a first image, further comprising receiving a second image from the environmental input device and identifying in the second image the processed image output by the image output device.

EXAMPLE 24

The method according to Example 23, further comprising determining a property of the physical object based on the processed image output by image output device and identified in the second image.

EXAMPLE 25

An apparatus for computing, comprising: means to operate in a physical environment, means to receive an image from a user, means to identify an object in the image, means to output, via an image output device, a processed image to identify the object, means to receive an environmental input from an environmental input device, and means to determine a user feedback based on the environmental input in relation to the processed image.

EXAMPLE 26

The apparatus according to Example 25, the means to determine the user feedback in relation to the processed image comprises means to determine whether the user feedback provides at least one of a confirmation of the object, a negation of the object, or a property of the object.

EXAMPLE 27

The apparatus according to Example 26, wherein the property of the object comprises at least one of an edge of the object, a geometric shape, an identification of the object as virtual or physical, or a metadata of the object.

EXAMPLE 28

The apparatus according to one or more of Example 25 to Example 27, wherein means to output the processed image identifying the object comprises means to form visually distinguished pixels corresponding to the object and means to output the visually distinguished pixels corresponding to the object.

EXAMPLE 29

The apparatus according to Example 28, wherein means to form visually distinguished pixels corresponding to the object comprises means to form pixels comprising at least one of a label, a structure light field, or pixels with a change in at least one of hue, saturation, lightness, and greyscale relative to pixels in the image from the user.

EXAMPLE 30

The apparatus according to one or more of Example 25 to Example 27, further comprising means to receive the image from an augmented reality headset associated with the user or an image file identified by the user.

EXAMPLE 31

The apparatus according to one or more of Example 25 to Example 27, wherein the environmental input device comprises at least one of a camera, a microphone, and a location service device, wherein the environmental input comprises at least one of an image, a speech or auditory input, a gesture input, or a text input.

EXAMPLE 32

The apparatus according to one or more of Example 25 to Example 27, wherein the means to operate in the physical environment further comprises means to use a robotic actuator to translate the apparatus through a space.

EXAMPLE 33

The apparatus according to Example 32, further comprising means to receive a location and means to translate the apparatus through the space via the robotic actuator to at least one of the location or until means to identify a physical object in the environmental input from the environmental input device corresponding to the object identified in the image identifies such physical object.

EXAMPLE 34

The apparatus according to Example 33, wherein means to output the processed image identifying the object comprises means to form visually distinguished pixels corresponding to the object and means to output the visually distinguished pixels corresponding to the object onto the physical object via the image output device.

EXAMPLE 35

The apparatus according to Example 34, wherein the image is a first image and further comprising means to receive a second image from the environmental input device and means to identify in the second image the processed image output by the image output device.

EXAMPLE 36

The apparatus according to Example 35, further comprising means to determine a property of the physical object based on the processed image output by image output device and identified in the second image.

EXAMPLE 37

One or more computer-readable media comprising instructions that cause a computer device, in response to execution of the instructions by a processor of the computer device, to: operate in a physical environment; receive an image from a user; identify an object in the image; output, via an image output device, a processed image to identify the object; receive an environmental input from an environmental input device; and determine a user feedback based on the environmental input in relation to the processed image.

EXAMPLE 38

The computer-readable media according to Example 37, wherein determine the user feedback in relation to the processed image comprises determine whether the user feedback provides at least one of a confirmation of the object, a negation of the object, or a property of the object.

EXAMPLE 39

The computer-readable media according to Example 38, wherein the property of the object comprises at least one of an edge of the object, a geometric shape, an identification of the object as virtual or physical, or a metadata of the object.

EXAMPLE 40

The computer-readable media according to one or more of Example 37 to Example 39, wherein output the processed image identifying the object comprises form visually distinguished pixels corresponding to the object and output the visually distinguished pixels corresponding to the object.

EXAMPLE 41

The computer-readable media according to Example 40, wherein form visually distinguished pixels corresponding to the object comprises form pixels comprising at least one of a label, a structure light field, or pixels with a change in at least one of hue, saturation, lightness, and greyscale relative to pixels in the image from the user.

EXAMPLE 42

The computer-readable media according to one or more of Example 37 to Example 39, further comprising receive the image from an augmented reality headset associated with the user or an image file identified by the user.

EXAMPLE 43

The computer-readable media according to one or more of Example 37 to Example 39, wherein the environmental input device comprises at least one of a camera, a microphone, and a location service device, wherein the environmental input comprises at least one of an image, a speech or auditory input, a gesture input, or a text input.

EXAMPLE 44

The computer-readable media according to one or more of Example 37 to Example 39, wherein operate in the physical environment further comprises utilize a robotic actuator to translate the computer device through a space.

EXAMPLE 45

The computer-readable media according to Example 44, further comprising receive a location and to translate the computer device through the space via the robotic actuator to at least one of the location or until the instructions cause the computer device to identify a physical object in the environmental input from the environmental input device corresponding to the object identified in the image.

EXAMPLE 46

The computer-readable media according to Example 45, wherein output the processed image identifying the object comprises form visually distinguished pixels corresponding to the object and output visually distinguished pixels corresponding to the object onto the physical object.

EXAMPLE 47

The computer-readable media according to Example 46, wherein the image is a first image and further comprising receive a second image from the environmental input device and identify in the second image the processed image output by the image output device.

EXAMPLE 48

The computer-readable media according to Example 47, wherein the instructions are further to cause the computer device to determine a property of the physical object based on the processed image output by image output device and identified in the second image.

EXAMPLE 49

A computer system comprising a mechanism to operate in a physical environment, an image output device, and an environmental input device, wherein the computer system is to receive an image from a user; identify an object in the image; output, via the image output device, a processed image to identify the object; receive an environmental input from an environmental input device; and determine a user feedback based on the environmental input in relation to the processed image.

EXAMPLE 50

The computer system according to Example 49, wherein determine the user feedback in relation to the processed image comprises determine whether the user feedback provides at least one of a confirmation of the object, a negation of the object, or a property of the object.

EXAMPLE 51

The computer system according to Example 50, wherein the property of the object comprises at least one of an edge of the object, a geometric shape, an identification of the object as virtual or physical, or a metadata of the object.

EXAMPLE 52

The computer system according to one or more of Example 49 to Example 51, wherein output the processed image identifying the object comprises form visually distinguished pixels corresponding to the object and output the visually distinguished pixels corresponding to the object.

EXAMPLE 53

The computer system according to Example 52, wherein form visually distinguished pixels corresponding to the object comprises form pixels comprising at least one of a label, a structure light field, or pixels with a change in at least one of hue, saturation, lightness, and greyscale relative to pixels in the image from the user.

EXAMPLE 54

The computer system according to one or more of Example 49 to Example 51, wherein the computer system is further to receive the image from an augmented reality headset associated with the user or an image file identified by the user.

EXAMPLE 55

The computer system according to one or more of Example 49 to Example 51, wherein the environmental input device comprises at least one of a camera, a microphone, and a location service device, wherein the environmental input comprises at least one of an image, a speech or auditory input, a gesture input, or a text input.

EXAMPLE 56

The computer system according to one or more of Example 49 to Example 51, wherein operate in the physical environment further comprises utilize a robotic actuator to translate the computer system through a space.

EXAMPLE 57

The computer system according to Example 56, further comprising receive a location and to translate the computer system through the space via the robotic actuator to at least one of the location or until the computer system identifies a physical object in the environmental input from the environmental input device corresponding to the object identified in the image.

EXAMPLE 58

The computer system according to Example 57, wherein output the processed image identifying the object comprises form visually distinguished pixels corresponding to the object and output visually distinguished pixels corresponding to the object onto the physical object with the image output device.

EXAMPLE 59

The computer system according to Example 58, wherein the image is a first image and wherein the computer system is further to receive a second image from the environmental input device and identify in the second image the processed image output by the image output device.

EXAMPLE 60

The computer system according to Example 59, wherein the computer system is further to determine a property of the physical object based on the processed image output by image output device and identified in the second image.

The invention claimed is:

1. A robotic apparatus comprising:
a mechanism, including a robotic actuator, to operate a robot in a physical environment;
a communication interface to receive from a user an image captured by a camera in an augmented reality headset worn by the user, the image having an object to be identified by the robot;
a knowledge engine, including a computer processor, coupled to the communication interface to identify the object in the received image; and
an image projection device coupled with the knowledge engine to project a processed image to convey identification of the object for the user, the processed image projected having visually distinguishing pixels corresponding to rendering of the object to visually distinguish the identified object for the user;
wherein the communication interface is to further receive feedback from the user to confirm correct identification of the object, based on the projected processed image with the identified object visually distinguished by their visually distinguishing pixels, and the mechanism is to operate the robot in the environment based at least in part on the received feedback, allowing the robot to learn and the user to interact with the robot, while the robot operates in the environment, based at least in part on the object containing image captured by the camera in the augmented reality headset worn by the user, the identification of the object by the robot and the feedback to the robot by the user.

2. The robotic apparatus according to claim 1, wherein the knowledge engine is to further determine the user feedback in relation to the processed image, including to determine whether the user feedback provides at least one of a confirmation of the object, a negation of the object, or a property of the object.

3. The robotic apparatus according to claim 2, wherein the property of the object comprises at least one of an edge of the object, a geometric shape, an identification of the object as virtual or physical, or a metadata of the object.

4. The robotic apparatus according to claim 1, wherein the visually distinguishing pixels corresponding to the rendering of the object comprise pixels of the object with a change in at least one of hue, saturation, lightness, and greyscale relative to corresponding pixels in the image captured by the camera in the augmented reality headset.

5. The robotic apparatus according to claim 1, wherein the knowledge engine is to further receive an environmental input from an environmental input device; and wherein the environmental input device comprises at least one of a camera, a microphone, and a location service device, and the environmental input comprises at least one of an image, a speech or auditory input, a gesture input, or a text input.

6. The robotic apparatus according to claim 1, wherein the knowledge engine is further to receive a location and is to translate the apparatus through the space via the robotic actuator to at least one of the location or until the knowledge engine identifies a physical object in an environmental input from an environmental input device corresponding to the object identified.

7. The robotic apparatus according to claim 1, wherein the image captured by the camera in the augmented reality headset is a first image, and wherein the knowledge engine is further to receive a second image from an environmental input device, the second image having the processed image projected by the image projection device, and to identify in the second image the processed image projected by the image projection device.

8. The robotic apparatus according to claim 7, wherein the knowledge engine is to further determine a property of the object based on the visually distinguishing pixels projected by the image projection device identified in the second image.

9. A method of robotic operation learning comprising:
using one or more actuators, operating, by a robot, in a physical environment,
receiving, by the robot, from a user, an image captured by a camera in an augmented reality headset worn by the user, the image having an object to be identified by the robot;
identifying, by the robot, the object in the image captured by the camera in the augmented reality headset of the user;
projecting, by the robot, a processed image to convey identification of the object, the processed image projected having visually distinguishing pixels corresponding to rendering of the object to visually distinguish the identified object; and receiving, by the robot, feedback from the user to confirm correct identification of the object, based on the projected processed image with the identified object visually distinguished by their visually distinguishing pixels;

wherein the learning of the robot in the environment is based at least in part on the received feedback, the image captured by the camera in the augmented reality headset worn by the user, and the identification of the object by the robot.

10. The method of robotic learning according to claim 9, wherein the visually distinguishing pixels corresponding to the rendering of the object comprise pixels of the object with a change in at least one of hue, saturation, lightness, and greyscale relative to corresponding pixels in the image captured by the camera in the augmented reality headset.

11. The method of robotic learning according to claim 9, wherein operate in the physical environment comprises using the one or more actuators by the robot to translate through a space.

12. The method of robotic learning according to claim 11, further comprising receiving, by the robot, a location and using the one or more actuators, by the robot, to translate through the space until identifying a physical object in environmental inputs from one or more environmental input devices, as corresponding to the object identified in the image of the augmented reality headset of the user.

13. The method of robotic learning according to claim 9, wherein the image captured by the camera in the augmented reality headset is a first image, and the method further comprises receiving, by the robot, a second image from the one or more environmental input devices, identifying in the second image the processed image projected, and determining a property of the physical object based on the projected processed image identified in the second image.

14. One or more non-transitory computer-readable media comprising instructions that cause a robot, operating in an environment, in response to execution of the instructions by a processor of the robot, to:
receive from a user an image captured by a camera in an augmented reality headset worn by the user;
identify an object in the image captured by the camera in the augmented reality headset of the user;
project a processed image to convey identification of the object, the processed image projected having visually distinguishing pixels corresponding to rendering of the object to visually distinguish the identified object; and
receive feedback from the user to confirm correct identification of the object, based on the projected processed image with the identified object visually distinguished by theft visually distinguishing pixels;
wherein the operation of the robot in the environment is based at least in part on the received feedback, allowing the robot to learn and the user to interact with the robot based at least in part on the image captured by the camera in the augmented reality headset worn by the user, the identification of the object by the robot, and the feedback to the robot by the user.

15. The non-transitory computer-readable media according to claim 14, wherein the user feedback includes at least one of a confirmation of the object, a negation of the object, or a property of the object.

16. The non-transitory computer-readable media according to claim 14, wherein the visually distinguishing pixels corresponding to rendering of the object comprise pixels of the object with a change in at least one of hue, saturation, lightness, and greyscale relative to corresponding pixels in the image captured by the camera in the augmented reality headset.

17. The non-transitory computer-readable media according to claim 14, wherein the operation in the environment comprises the robot translating through a space.

18. The non-transitory computer-readable media according to claim 17, wherein the instructions are further to cause the robot to receive a location and to translate the robot through the space until a physical object in environmental inputs received from one or more environmental input devices is identified as corresponding to the object identified in the image captured by the camera in the augmented reality headset of the user.

19. The non-transitory computer-readable media according to claim 14, wherein the image captured by the augmented reality headset is a first image, and the robot is further caused to receive a second image from an environmental input device, identify in the second image the processed image projected, and determine a property of the physical object based on the processed image projected and identified in the second image.

* * * * *

UNITED STATES PATENT AND TRADEMARK OFFICE
CERTIFICATE OF CORRECTION

PATENT NO. : 10,860,853 B2  
APPLICATION NO. : 15/582106  
DATED : December 8, 2020  
INVENTOR(S) : Carl S. Marshall et al.

It is certified that error appears in the above-identified patent and that said Letters Patent is hereby corrected as shown below:

In the Claims

Column 22
Line 6, "…theft…" should read – "…their…" –

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*